(12) United States Patent
Akita (10) Patent No.: US 12,365,257 B2
(45) Date of Patent: Jul. 22, 2025

(54) POWER SUPPLY SYSTEM

(71) Applicant: KABUSHIKI KAISHA TOYOTA JIDOSHOKKI, Aichi (JP)

(72) Inventor: Yoshifumi Akita, Aichi (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 63 days.

(21) Appl. No.: 18/382,100

(22) Filed: Oct. 20, 2023

(65) Prior Publication Data

US 2024/0140226 A1    May 2, 2024

(30) Foreign Application Priority Data

Oct. 28, 2022   (JP) .................... 2022-173264

(51) Int. Cl.
*B60L 53/22* (2019.01)
*H02M 1/00* (2007.01)
*H02M 3/155* (2006.01)

(52) U.S. Cl.
CPC ............ *B60L 53/22* (2019.02); *H02M 1/007* (2021.05); *H02M 3/155* (2013.01); *B60L 2210/10* (2013.01); *H02J 2207/20* (2020.01)

(58) Field of Classification Search
CPC .... B60L 53/22; B60L 2210/10; H02M 1/007; H02M 3/155; H02J 2207/20
See application file for complete search history.

(56) References Cited

U.S. PATENT DOCUMENTS

| | | | |
|---|---|---|---|
| 2017/0240145 A1* | 8/2017 | Ohta | ................ B60T 1/10 |
| 2018/0312074 A1 | 11/2018 | Tsutsumi | |
| 2021/0221249 A1* | 7/2021 | Ge | ............ H02M 1/4225 |
| 2022/0037074 A1* | 2/2022 | Tashiro | ............ H02M 3/33576 |

FOREIGN PATENT DOCUMENTS

JP    2018-191399 A    11/2018

* cited by examiner

*Primary Examiner* — Rexford N Barnie
*Assistant Examiner* — Duc M Pham
(74) *Attorney, Agent, or Firm* — GREENBLUM & BERNSTEIN, P.L.C.

(57) ABSTRACT

A power supply includes: a wiring to which direct current (DC) electric power is supplied from an external power supply; a first DC/DC converter that converts a voltage value of the DC electric power supplied to the wiring into another voltage value to output the DC electric power to a load group; a first filter unit having a first cutoff frequency; a second DC/DC converter that converts the voltage value of the DC electric power supplied to the wiring into another voltage value to output the DC electric power to the load group; a second filter unit having a second cutoff frequency higher than the first cutoff frequency; and a controller that controls the first DC/DC converter when DC electric power is supplied from the external power supply to the wiring and when DC electric power needs to be supplied to the load group.

2 Claims, 7 Drawing Sheets

POWER SUPPLY SYSTEM

CROSS-REFERENCE TO RELATED APPLICATION

This application claims the benefit of priority from Japanese Patent Application No. 2022-173264 filed with Japan Patent Office on Oct. 28, 2022, the entire contents of which are incorporated herein by reference.

BACKGROUND

There is known a vehicle equipped with a charging device capable of charging an in-vehicle battery with electric power supplied from an external power supply. Japanese Patent Application Laid-Open Publication No. 2018-191399 discloses an electric vehicle including a high-voltage battery, a low-voltage battery, and a DC/DC converter provided between the high-voltage battery and the low-voltage battery.

SUMMARY

Different noise levels are required depending on the operation mode of the vehicle. To meet these requirements, the DC/DC converter is equipped with a noise filter. However, as the electric current of the DC/DC converter is increased, the size of the noise filter is increased.

The present disclosure describes a power supply system capable of suppressing an increase in size of the power supply system.

A power supply system according to one aspect of the present disclosure is a power supply system mounted on a vehicle. The power supply system includes: a wiring to which direct current (DC) electric power is supplied from an external power supply; a DC power supply connected to the wiring; a first DC/DC converter that converts a voltage value of the DC electric power supplied to the wiring into another voltage value to output the DC electric power to a load group including at least one load; a first filter unit having a first cutoff frequency and connected to the wiring and the first DC/DC converter; a second DC/DC converter that converts the voltage value of the DC electric power supplied to the wiring into another voltage value to output the DC electric power to the load group; a second filter unit having a second cutoff frequency higher than the first cutoff frequency and connected to the wiring and the second DC/DC converter; and a controller that controls the first DC/DC converter and the second DC/DC converter. The controller controls the first DC/DC converter when DC electric power is supplied from the external power supply to the wiring and when DC electric power needs to be supplied to the load group.

In the power supply system, the wiring to which DC electric power is supplied from the external power supply and the first DC/DC converter for converting the voltage value of the DC electric power supplied to the wiring into another voltage value are electrically connected to each other via the first filter unit having the first cutoff frequency, and the wiring and the second DC/DC converter for converting the voltage value of the DC electric power supplied to the wiring into another voltage value are electrically connected to each other via the second filter unit having the second cutoff frequency higher than the first cutoff frequency. When DC electric power is supplied to the wiring from the external power supply and DC electric power needs to be supplied to the load group, the first DC/DC converter is controlled. Thus, the wiring and the first DC/DC converter are electrically connected to each other via the first filter unit which can reduce noise in the frequency band lower than that of noise that can be reduced by the second filter unit. This makes it possible to suppress transmission of noise in a low frequency band to the external power supply. On the other hand, when the vehicle is traveling, since the first DC/DC converter and the second DC/DC converter are not electrically connected to an external power supply, it is not necessary to suppress noise in a low frequency band that can be suppressed by the first filter unit but cannot be suppressed by the second filter unit, and the second DC/DC converter can be driven. Thus, when a large amount of DC electric power is required in the load group, a large amount of DC electric power can be supplied to the load group by driving the first DC/DC converter and the second DC/DC converter. Further, although the second filter unit can suppress only noise in a frequency band higher than that of noise that can be suppressed by the first filter unit, the second filter unit has a smaller circuit scale than the first filter unit. Therefore, it is possible to provide the power supply system capable of supplying a large amount of electric power to the load group and suppressing transmission of noise in a low frequency band to an external power supply at a low cost, and it is possible to suppress an increase in size of the power supply system.

In some embodiments, the first cutoff frequency and the second cutoff frequency may be set so that a fluctuation range of a voltage value at an output terminal of the first DC/DC converter and a fluctuation range of a voltage value at an output terminal of the second DC/DC converter fall within an allowable range of an input voltage of the load group. When the first DC/DC converter and the second DC/DC converter are operated at the same time, noise generated by one DC/DC converter is input to the other DC/DC converter, and the voltage value at the output terminal can fluctuate due to the noise. According to the above-described configuration, since the fluctuation range of the voltage value at the output terminal of the first DC/DC converter and the fluctuation range of the voltage value at the output terminal of the second DC/DC converter fall within the allowable range of the input voltage of the load group, stable electric power can be supplied to the load group.

In some embodiments, the first cutoff frequency and the second cutoff frequency may be set so that a resonance frequency of the first filter unit when a signal passes through the first filter unit from the first DC/DC converter toward the wiring does not match a resonance frequency of the second filter unit when a signal passes through the second filter unit from the wiring toward the second DC/DC converter and so that a resonance frequency of the first filter unit when a signal passes through the first filter unit from the wiring toward the first DC/DC converter does not match a resonance frequency of the second filter unit when a signal passes through the second filter unit from the second DC/DC converter toward the wiring.

Noise generated in the first DC/DC converter may be transmitted through a path passing through the first filter unit, the wiring, the second filter unit, and the second DC/DC converter in order. In this case, when the resonance frequency of the first filter unit when a signal passes through the first filter unit from the first DC/DC converter toward the wiring matches the resonance frequency of the second filter unit when a signal passes through the second filter unit from the wiring toward the second DC/DC converter, the fluctuation range of the voltage value at the output terminal of the second DC/DC converter may exceed the allowable range of the input voltage of the load group due to the resonance. Similarly, noise generated in the second DC/DC converter may be transmitted through a path passing through the second filter unit, the wiring, the first filter unit, and the first DC/DC converter in order. In this case, when the resonance frequency of the first filter unit when a signal passes through the first filter unit from the wiring toward the first DC/DC converter matches the resonance frequency of the second filter unit when a signal passes through the second filter unit from the second DC/DC converter toward the wiring, the fluctuation range of the voltage value at the output terminal of the first DC/DC converter may exceed the allowable range of the input voltage of the load group due to the resonance. According to the configuration described above, since the resonance frequency of the first filter unit does not match the resonance frequency of the second filter unit in each path, the fluctuation range of the voltage value at the output terminal of the first DC/DC converter and the fluctuation range of the voltage value at the output terminal of the second DC/DC converter can be prevented from exceeding the allowable range of the input voltage of the load group.

According to the present disclosure, it is possible to suppress an increase in size of the power supply system.

DETAILED DESCRIPTION

Hereinafter, a power supply system according to an embodiment will be described in detail with reference to the accompanying drawings. In the description of the drawings, the same or equivalent elements are denoted by the same reference numerals, and redundant description is omitted.

Figure 1:
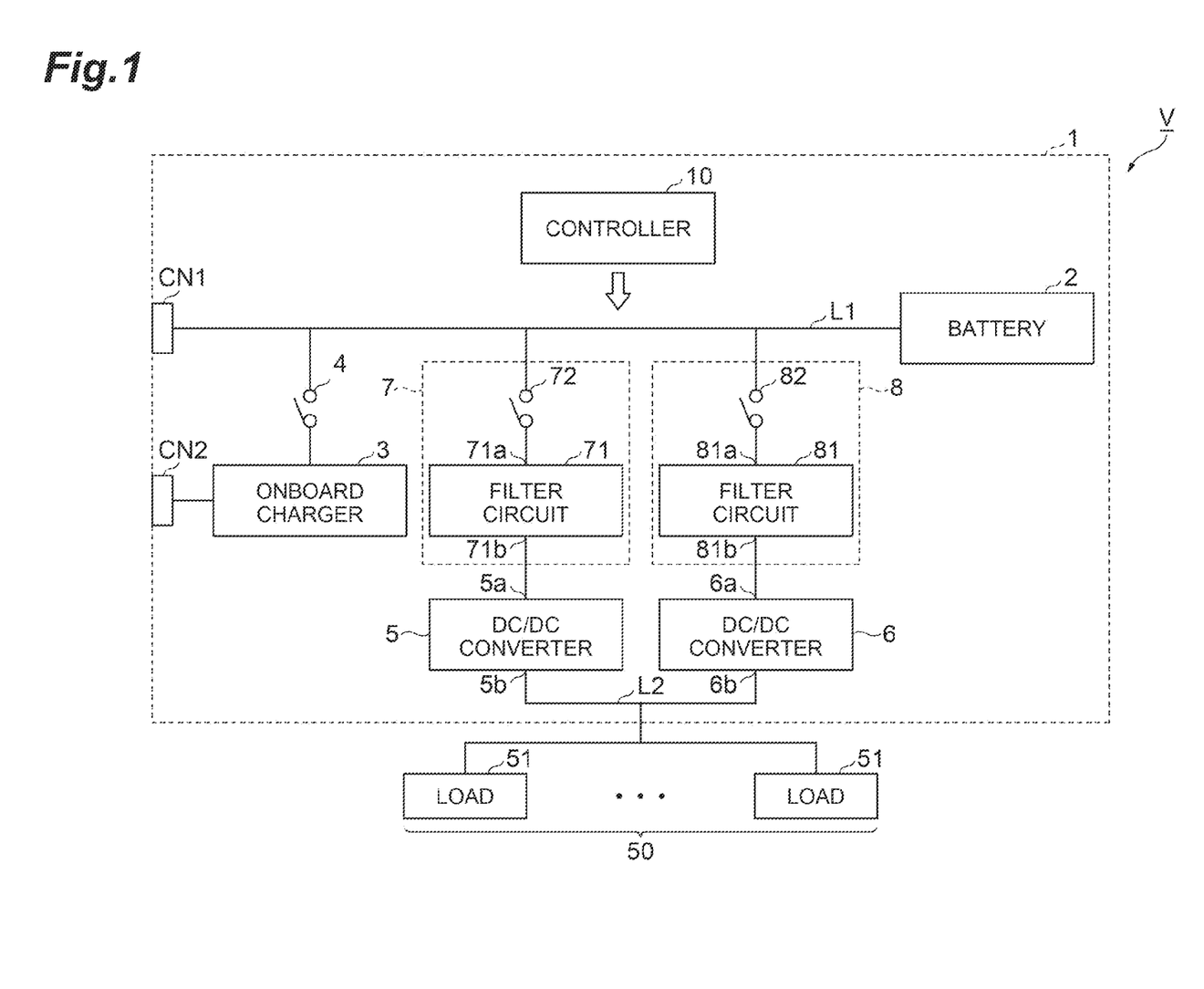
FIG. 1 is a schematic configuration diagram of a power supply system according to an embodiment.

A schematic configuration of a power supply system according to an embodiment will be described with reference to FIG. 1. FIG. 1 is a schematic configuration diagram of a power supply system according to an embodiment. A power supply system 1 shown in FIG. 1 is mounted on a vehicle V and supplies DC electric power to a load group 50 mounted on the vehicle V. Examples of the vehicle V include a forklift, a hybrid vehicle, and an electric vehicle. The load group 50 includes at least one load 51. Examples of the load 51 include a navigation system and an in-vehicle radio.

The power supply system 1 includes a battery 2 (DC power supply), an onboard charger 3, a switch 4, a DC/DC converter 5 (first DC/DC converter), a DC/DC converter 6 (second DC/DC converter), a filter unit 7 (first filter unit), a filter unit 8 (second filter unit), a controller 10, a connector CN1, a connector CN2, a wiring L1, and a wiring L2.

The connector CN1 is a connector for connecting a DC charger (external power supply) that outputs DC electric power. The DC charger supplies DC electric power to the wiring L1 via the connector CN1. The connector CN2 is a connector for connecting an alternating current (AC) charger (external power supply) that outputs AC electric power, and is connected to the onboard charger 3. The DC electric power output from the DC charger is supplied to the wiring L1. The DC electric power output from the onboard charger 3 is supplied to the wiring L1. The onboard charger 3 converts the AC electric power supplied from the AC charger via the connector CN2 into DC electric power to output the DC electric power to the wiring L1. It can be said that DC electric power is supplied from the AC charger via the connector CN2 and the onboard charger 3 to the wiring L1. The wiring L2 is a wiring for supplying DC electric power to the load group 50. DC electric power is supplied to the wiring L2 from one or both of the DC/DC converter 5 and the DC/DC converter 6. The voltage value of the DC electric power supplied to the wiring L2 is different from the voltage value of the DC electric power supplied to the wiring L1. The voltage value of the DC electric power supplied to the wiring L2 is, for example, 12 V.

The battery 2 is a chargeable and dischargeable secondary battery. Examples of the battery 2 include a lithium-ion battery, a lead-acid battery, and a nickel metal hydride battery. The battery 2 may be a battery module including a plurality of battery cells. The battery 2 is connected to the wiring L1 and is charged by DC electric power supplied to the wiring L1 by the DC charger or the onboard charger 3.

The onboard charger 3 includes an AC/DC converter, and converts the AC electric power supplied from the AC charger via the connector CN2 into DC electric power to output the DC electric power to the wiring L1 as described above.

The switch 4 is a circuit element capable of switching the electrical connection state between both ends of the switch 4 between the conductive state (ON state) and the non-conductive state (OFF state). The switch 4 may be constituted by a semiconductor such as a metal oxide semiconductor field effect transistor (MOSFET) and an insulated gate bipolar transistor (IGBT), or may be constituted by a relay, for example. The switch 4 is provided between the onboard charger 3 and the wiring L1. The onboard charger 3 is electrically connected to the wiring L1 by setting the switch 4 to the conductive state. The onboard charger 3 is electrically disconnected from the wiring L1 by setting the switch 4 to the non-conductive state.

Each of the DC/DC converter 5 and the DC/DC converter 6 is a circuit that converts the voltage value of the DC electric power supplied to the wiring L1 into another voltage value to supply the DC electric power having the converted voltage value to the load group 50 via the wiring L2. The DC/DC converter 5 includes an input terminal 5a and an output terminal 5b. The input terminal 5a is connected to the wiring L1 via the filter unit 7. The output terminal 5b is connected to the wiring L2. The DC/DC converter 6 includes an input terminal 6a and an output terminal 6b. The input terminal 6a is connected to the wiring L1 via the filter unit 8. The output terminal 6b is connected to the wiring L2.

The DC/DC converter 5 and the DC/DC converter 6 are driven by the controller 10. The switching frequencies of the DC/DC converter 5 and the DC/DC converter 6 are, for example, about 170 kHz. When the vehicle V is in the charging mode, only the DC/DC converter 5 is used. The charging mode is an operation mode for charging the battery 2. When the vehicle V is in the driving mode, either the DC/DC converter 5 or the DC/DC converter 6 may be used, or both may be used. The driving mode is an operation mode in which the vehicle V travels.

The filter unit 7 is a portion for electrically connecting the wiring L1 and the DC/DC converter 5, and is connected to the wiring L1 and the DC/DC converter 5. The filter unit 7 includes a filter circuit 71 (first filter circuit) and a switch 72 (first switch).

The filter circuit 71 is a low-pass filter and has a cutoff frequency fc1 (first cutoff frequency). Since the DC/DC converter 5 is used when the vehicle V is in the charging mode, the cutoff frequency fc1 is set to a frequency at which noise in a low frequency band can be removed. The filter circuit 71 includes a terminal 71a and a terminal 71b. The terminal 71a is connected to the wiring L1 via the switch 72, and the terminal 71b is connected to the input terminal 5a of the DC/DC converter 5. The gain characteristics of the filter circuit 71 will be described later.

The switch 72 is a circuit element capable of switching the electrical connection state between both ends of the switch 72 between the conductive state (ON state) and the non-conductive state (OFF state). The switch 72 may be constituted by a semiconductor such as a MOSFET and an IGBT, or may be constituted by a relay, for example. One end of the switch 72 is connected between the switch 4 and the battery 2 in the wiring L1, and the other end of the switch 72 is connected to the terminal 71a of the filter circuit 71. When the switch 72 is set to the conductive state, the filter unit 7 electrically connects the wiring L1 and the DC/DC converter 5 via the filter circuit 71. When the switch 72 is set to the non-conductive state, the filter unit 7 electrically disconnects the DC/DC converter 5 from the wiring L1.

The filter unit 8 is a portion for electrically connecting the wiring L1 and the DC/DC converter 6, and is connected to the wiring L1 and the DC/DC converter 6. The filter unit 8 includes a filter circuit 81 (second filter circuit) and a switch 82 (second switch).

The filter circuit 81 is a low-pass filter and has a cutoff frequency fc2 (second cutoff frequency). The cutoff frequency fc2 is higher than the cutoff frequency fc1. Since the DC/DC converter 6 is used when the vehicle V is in the driving mode, the cutoff frequency fc2 is set to a frequency at which noise in the FM band or higher can be removed, for example. The filter circuit 81 includes a terminal 81a and a terminal 81b. The terminal 81a is connected to the wiring L1 via the switch 82, and the terminal 81b is connected to the input terminal 6a of the DC/DC converter 6. The gain characteristics of the filter circuit 81 will be described later.

The switch 82 is a circuit element capable of switching the electrical connection state between both ends of the switch 82 between the conductive state (ON state) and the non-conductive state (OFF state). The switch 82 may be constituted by a semiconductor such as a MOSFET and an IGBT, or may be constituted by a relay, for example. One end of the switch 82 is connected between the switch 4 and the battery 2 in the wiring L1, and the other end of the switch 82 is connected to the terminal 81a of the filter circuit 81. When the switch 82 is set to the conductive state, the filter unit 8 electrically connects the wiring L1 and the DC/DC converter 6 via the filter circuit 81. When the switch 82 is set to the non-conductive state, the filter unit 8 electrically disconnects the DC/DC converter 6 from the wiring L1.

The controller 10 is a device (controller) that integrally controls the power supply system 1. The controller 10 is constituted by a central processing unit (CPU), a random access memory (RAM), a read only memory (ROM), an input/output interface, and the like. The controller 10 controls, for example, the onboard charger 3, the switch 4, the DC/DC converter 5, the DC/DC converter 6, the switch 72, and the switch 82. The controller 10 switches the connection states of the switches 4, 72, and 82 depending on the operation mode of the vehicle V. The switching control performed by the controller 10 will be described later.

Figure 2A:
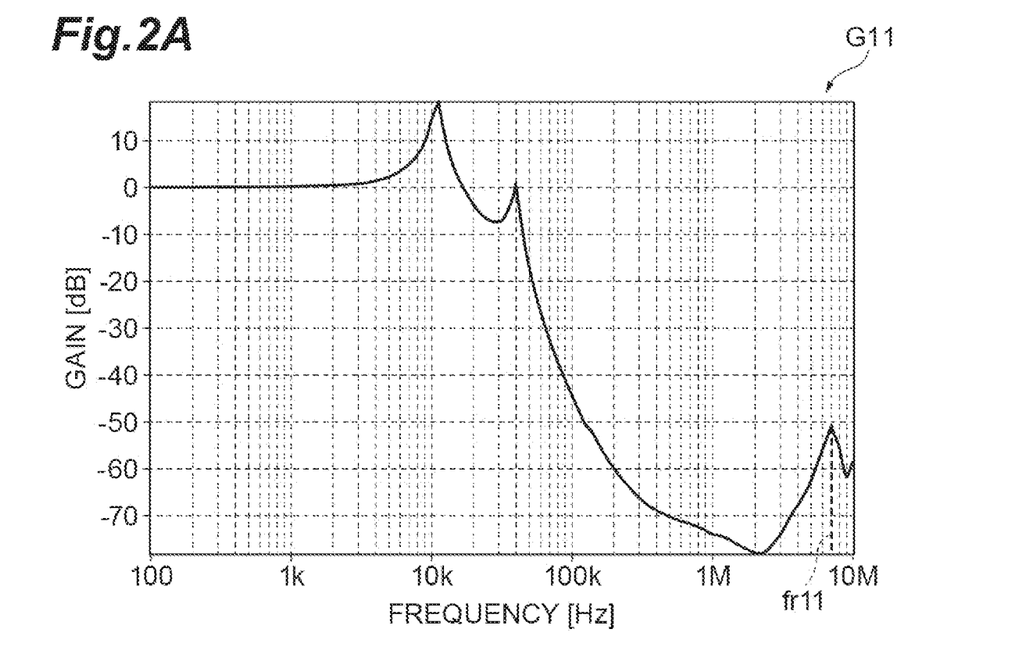
FIG. 2A is a diagram showing gain characteristics of the filter circuit 71 when a signal passes through the filter circuit 71 from the DC/DC converter 5 toward the wiring L1.
Figure 2B:
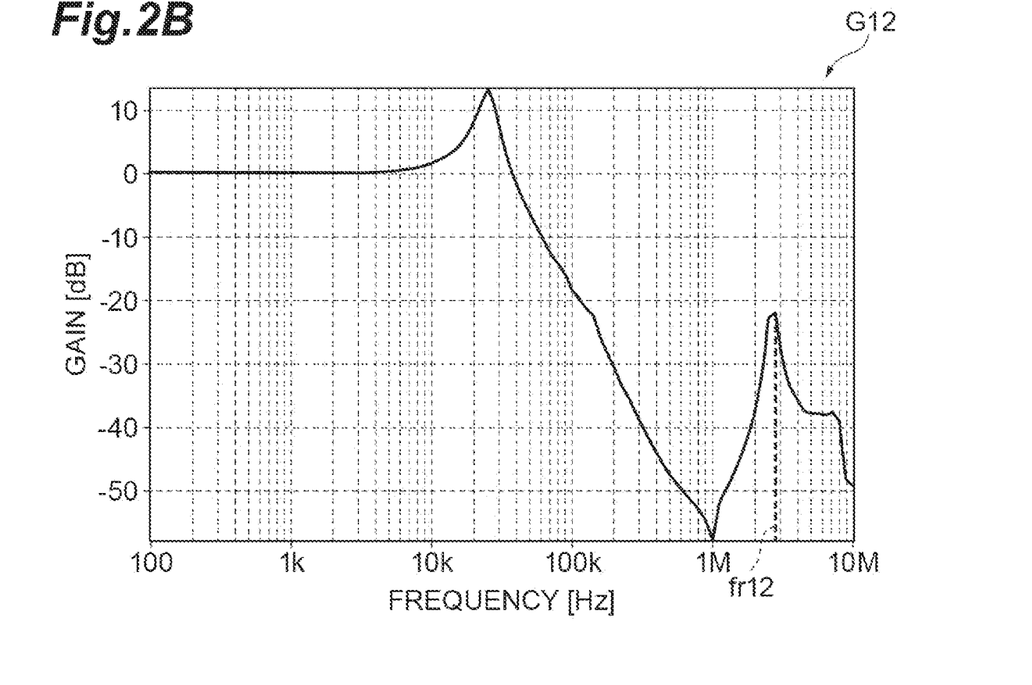
FIG. 2B is a diagram showing gain characteristics of the filter circuit 71 when a signal passes through the filter circuit 71 from the wiring L1 toward the DC/DC converter 5.
Figure 3A:
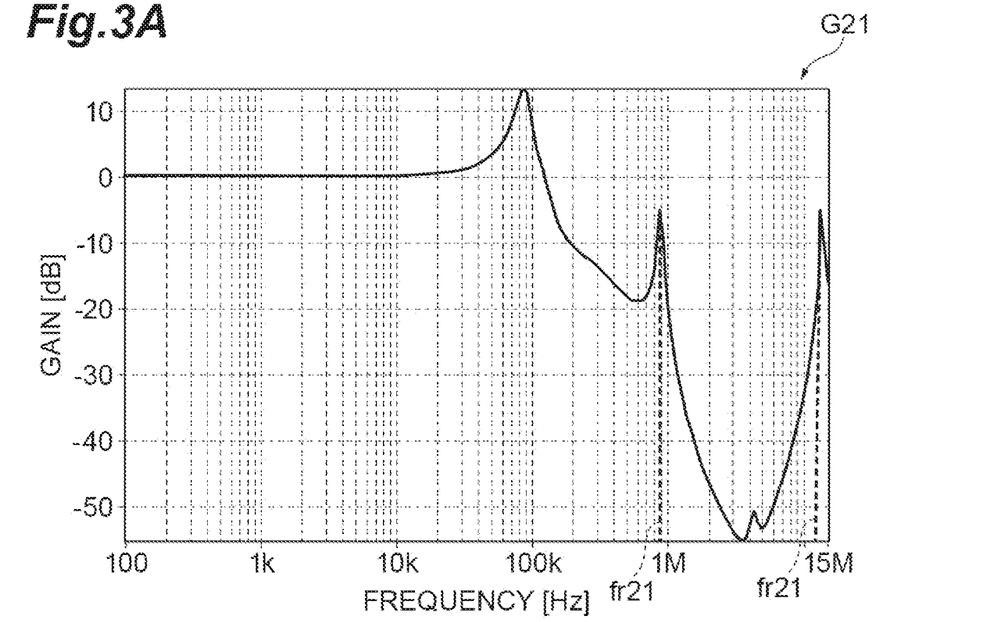
FIG. 3A is a diagram showing gain characteristics of the filter circuit 81 when a signal passes through the filter circuit 81 from the DC/DC converter 6 toward the wiring L1.
Figure 3B:
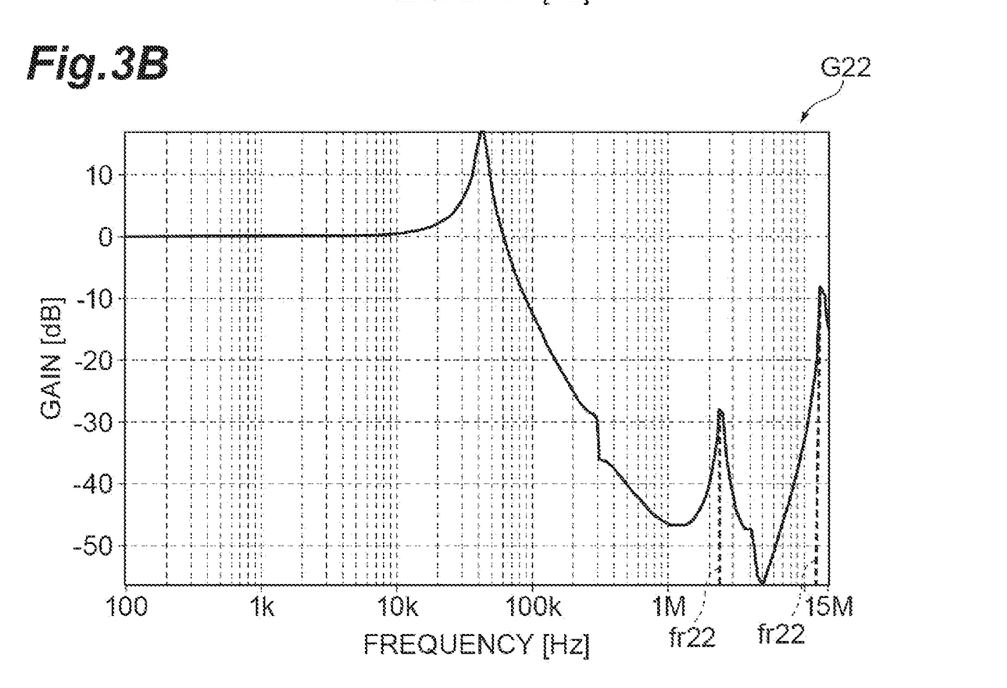
FIG. 3B is a diagram showing gain characteristics of the filter circuit 81 when a signal passes through the filter circuit 81 from the wiring L1 toward the DC/DC converter 6.

Next, the gain characteristics of the filter circuit 71 and the filter circuit 81 will be described with reference to FIGS. 2A, 2B, 3A and 3B. FIG. 2A is a diagram showing gain characteristics of the filter circuit 71 when a signal passes through the filter circuit 71 from the DC/DC converter 5 toward the wiring L1. FIG. 2B is a diagram showing gain characteristics of the filter circuit 71 when a signal passes through the filter circuit 71 from the wiring L1 toward the DC/DC converter 5. FIG. 3A is a diagram showing gain characteristics of the filter circuit 81 when a signal passes through the filter circuit 81 from the DC/DC converter 6 toward the wiring L1. FIG. 3B is a diagram showing gain characteristics of the filter circuit 81 when a signal passes through the filter circuit 81 from the wiring L1 toward the DC/DC converter 6. In each figure, the horizontal axis represents frequencies (unit: Hz) and the vertical axis represents gain (unit: dB).

As shown in FIGS. 2A and 2B, the filter circuit 71 has different gain characteristics depending on the direction in which a signal passes through the filter circuit 71. In the gain characteristics G11 of the filter circuit 71 when a signal passes through the filter circuit 71 from the DC/DC converter 5 toward the wiring L1 (when a signal passes through the filter circuit 71 from the terminal 71b toward the terminal 71a), a resonance frequency fr11 is generated around 7 MHz. In the gain characteristics G12 of the filter circuit 71 when a signal passes through the filter circuit 71 from the wiring L1 toward the DC/DC converter 5 (when a signal passes through the filter circuit 71 from the terminal 71a toward the terminal 71b), a resonance frequency fr12 is generated around 2.5 MHz.

As shown in FIGS. 3A and 3B, the filter circuit 81 has different gain characteristics depending on the direction in which a signal passes through the filter circuit 81. In the gain characteristics G21 of the filter circuit 81 when a signal passes through the filter circuit 81 from the DC/DC converter 6 toward the wiring L1 (when a signal passes through the filter circuit 81 from the terminal 81b toward the terminal 81a), resonance frequencies fr21 are generated near 900 kHz and 13 MHz. In the gain characteristics G22 of the filter circuit 81 when a signal passes through the filter circuit 81 from the wiring L1 toward the DC/DC converter 6 (when a signal passes through the filter circuit 81 from the terminal 81a toward the terminal 81b), resonance frequencies fr22 are generated near 2.2 MHz and 13 MHz.

As will be described later, the cutoff frequency fc1 and the cutoff frequency fc2 are set so that the resonance frequency fr11 does not match any of the resonance frequencies fr22 and the resonance frequency fr12 does not match any of the resonance frequencies fr21.

Figure 4:
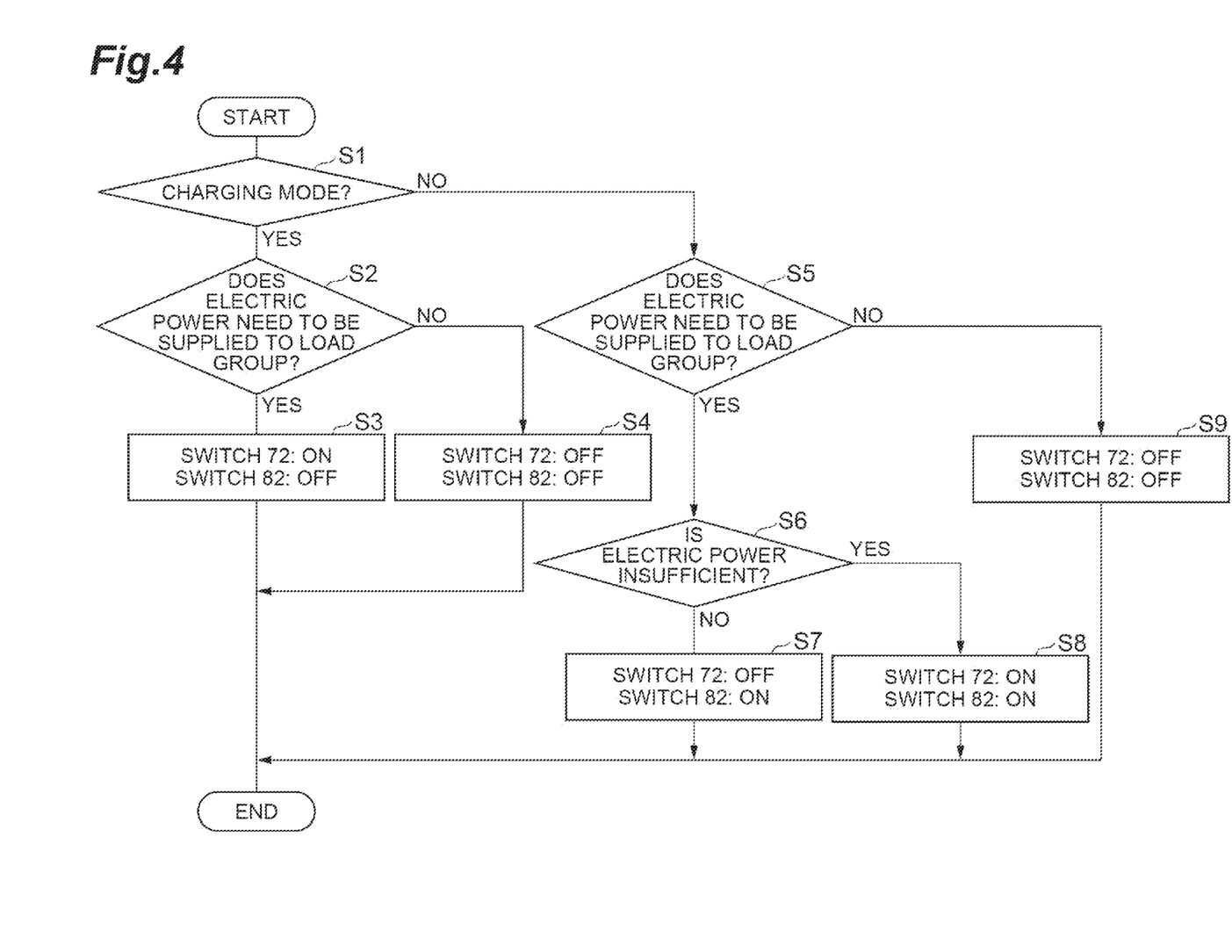
FIG. 4 is a flowchart showing an example of switching control performed by the controller shown in FIG. 1.
Figure 5:
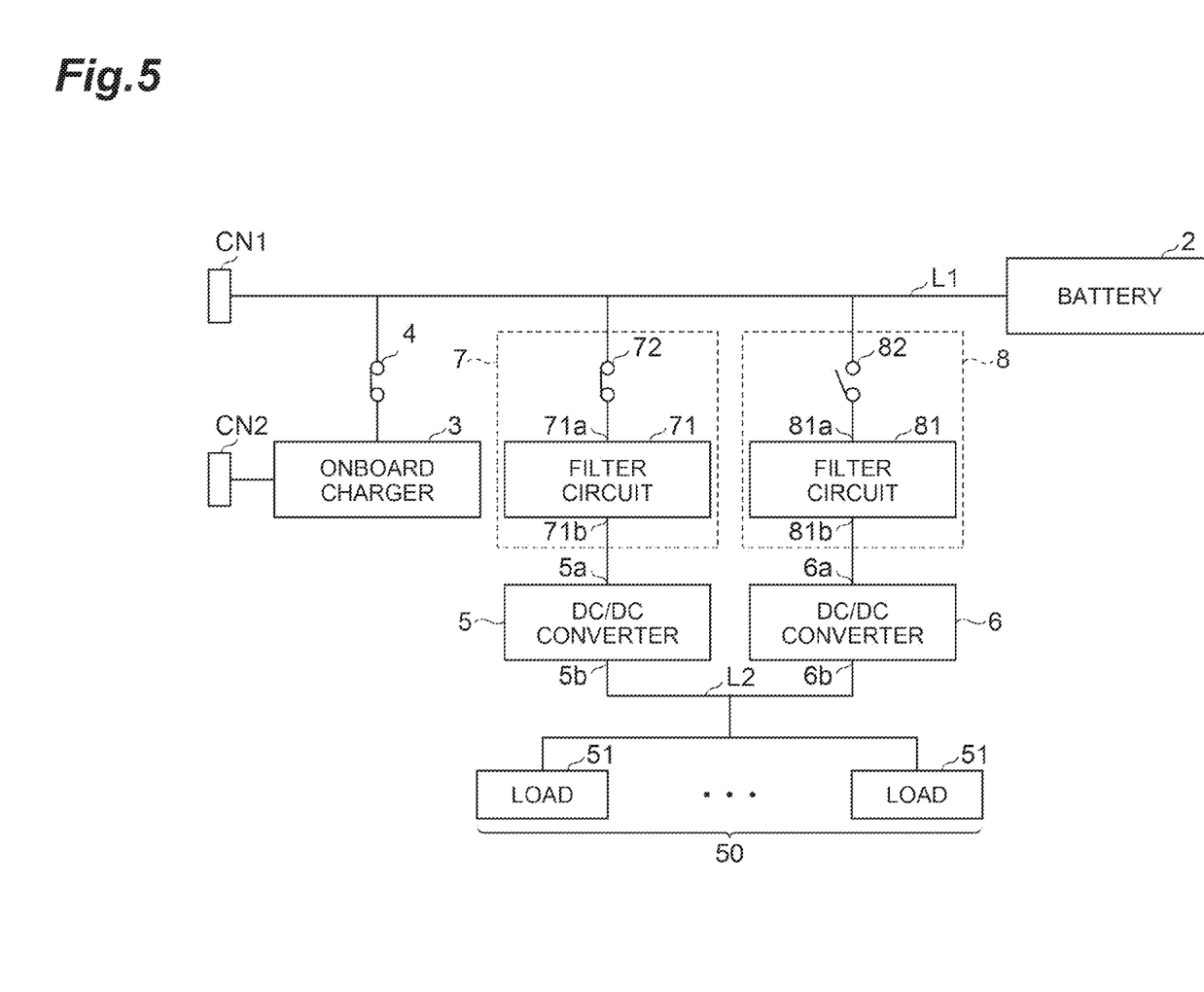
FIG. 5 is a diagram for explaining an example of the operation of the power supply system.
Figure 6:
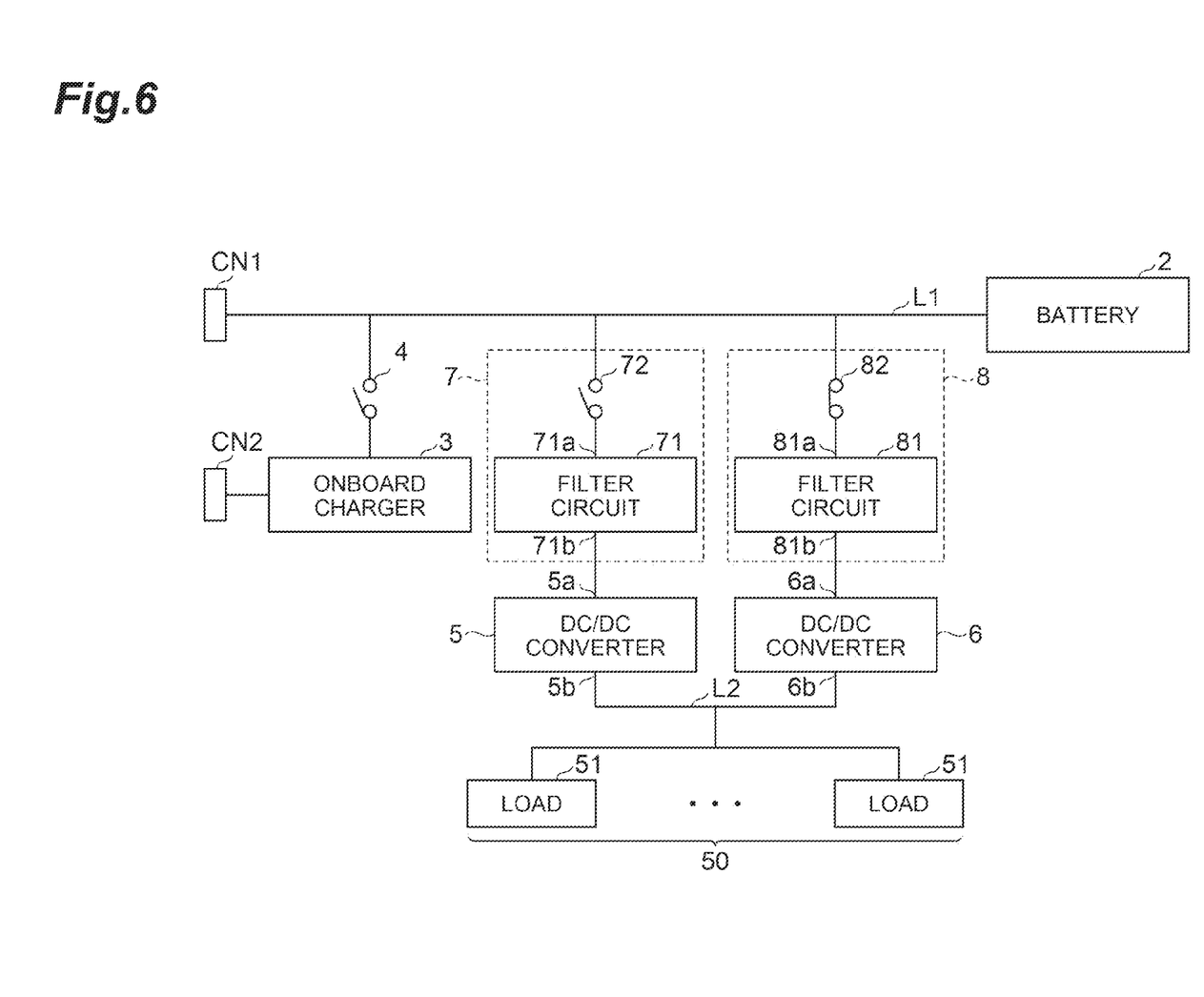
FIG. 6 is a diagram for explaining another example of the operation of the power supply system.
Figure 7:
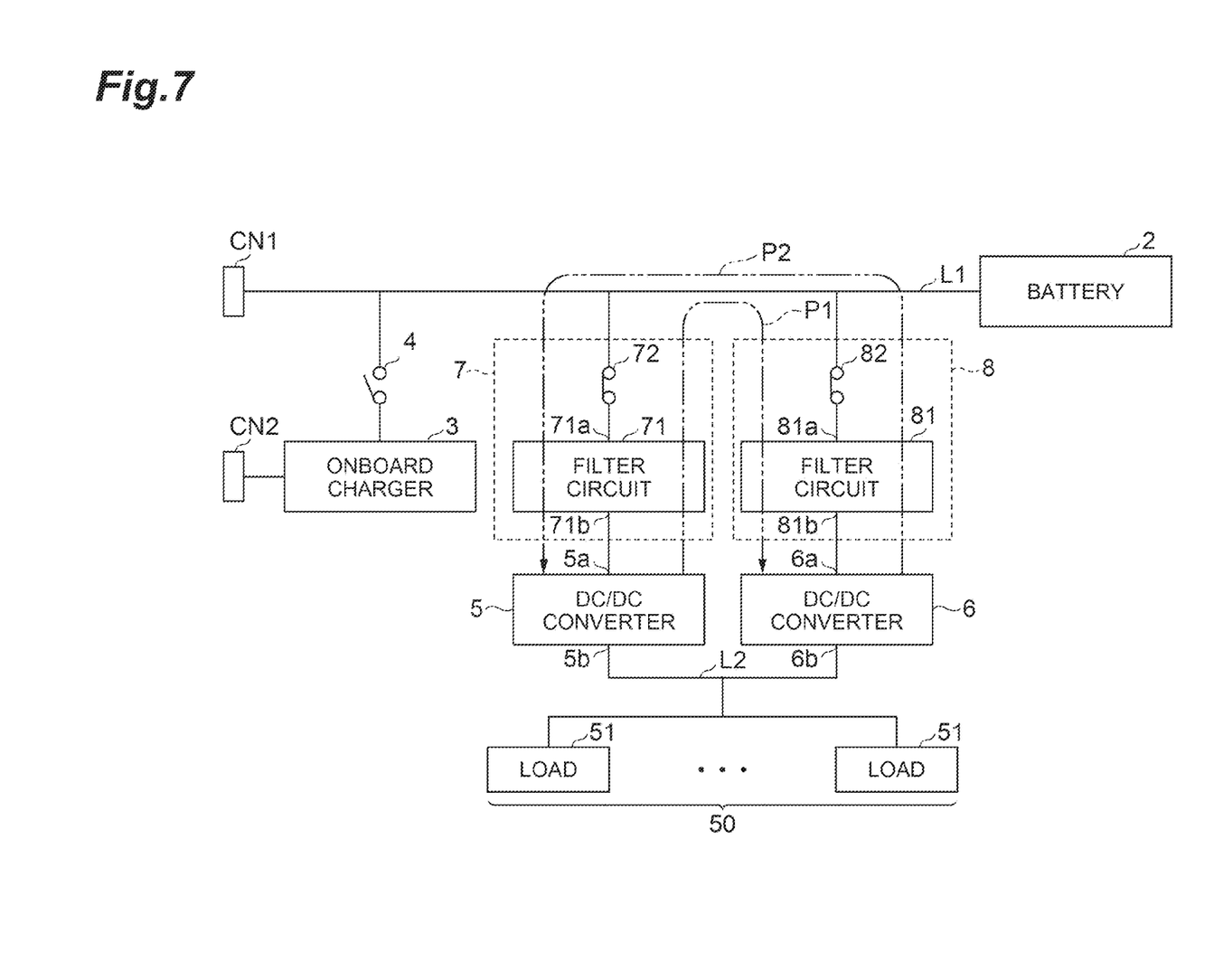
FIG. 7 is a diagram for explaining yet another example of the operation of the power supply system.

Next, the operation of the power supply system 1 will be described with reference to FIGS. 4 to 7. FIG. 4 is a flowchart showing an example of switching control performed by the controller shown in FIG. 1. FIGS. 5 to 7 are diagrams for explaining an example of the operation of the power supply system. The processes shown in FIG. 4 is repeated at predetermined time intervals, for example.

As shown in FIG. 4, the controller 10 first determines whether or not the vehicle V is in the charging mode (step S1). In step S1, the controller 10 determines that the vehicle V is in the charging mode when the controller 10 detects that a DC charger is connected to the connector CN1 or when the controller 10 detects that an AC charger is connected to the connector CN2. When the controller 10 detects that an AC charger is connected to the connector CN2, the controller 10 sets the switch 4 to the conductive state and operates the onboard charger 3. Thus, when an AC charger is connected to the connector CN2, the AC electric power supplied from the AC charger is converted into DC electric power and the DC electric power is supplied to the wiring L1 to charge the battery 2. When a DC charger is connected to the connector CN1, DC electric power is supplied from the DC charger to the wiring L1 to charge the battery 2.

When it is determined in step S1 that the vehicle V is in the charging mode (step S1: YES), the controller 10 determines whether or not DC electric power needs to be supplied to the load group 50 (step S2). For example, when the controller 10 detects that one of the loads 51 is operating, the controller 10 determines that DC electric power needs to be supplied to the load group 50. Here, even when the DC/DC converter 5 and the DC/DC converter 6 are not operating, DC electric power necessary for starting each load 51 is supplied to the load 51 from an auxiliary battery (not shown).

When it is determined in step S2 that DC electric power needs to be supplied to the load group 50 (step S2: YES), as shown in FIG. 5, the controller 10 sets the switch 72 to the conductive state, sets the switch 82 to the non-conductive state, and operates the DC/DC converter 5 (step S3). At this time, the DC/DC converter 6 is not operating. By this process, the voltage value of the DC electric power supplied to the wiring L1 is converted into another voltage value by the DC/DC converter 5 and the DC electric power having the converted voltage value is supplied to the wiring L2. Thus, the series of processes shown in FIG. 4 ends.

On the other hand, when it is determined in step S2 that DC electric power does not need to be supplied to the load group 50 (step S2: NO), the controller 10 sets the switch 72 and the switch 82 to the non-conductive state (step S4). At this time, the DC/DC converter 5 and the DC/DC converter 6 are not operating. Thus, the series of processes shown in FIG. 4 ends.

When it is determined in step S1 that the vehicle V is not in the charging mode (step S1: NO), the controller 10 determines whether or not DC electric power needs to be supplied to the load group 50 as in step S2 (step S5). When it is determined in step S5 that DC electric power needs to be supplied to the load group 50 (step S5: YES), the controller 10 determines whether or not the DC electric power to be supplied to the load group 50 is insufficient (step S6). For example, the controller 10 compares the total power consumption of the operating loads 51 with the maximum electric power that can be supplied by the DC/DC converter 6, and determines that the DC electric power to be supplied to the load group 50 is insufficient when the total power consumption exceeds the maximum electric power that can be supplied.

When it is determined in step S6 that the DC electric power to be supplied to the load group 50 is not insufficient (step S6: NO), as shown in FIG. 6, the controller 10 sets the switch 4 and the switch 72 to the non-conductive state, sets the switch 82 to the conductive state, and operates the DC/DC converter 6 (step S7). At this time, the DC/DC converter 5 is not operating. By this process, the voltage value of the DC electric power supplied from the battery 2 to the wiring L1 is converted into another voltage value by the DC/DC converter 6 and the DC electric power having the converted voltage value is supplied to the wiring L2. Thus, the series of processes shown in FIG. 4 ends.

When it is determined in step S6 that the DC electric power to be supplied to the load group 50 is insufficient (step S6: YES), as shown in FIG. 7, the controller 10 sets the switch 4 to the non-conductive state and sets the switch 72 and the switch 82 to the conductive state (step S8). Then, the controller 10 operates the DC/DC converter 5 in addition to the DC/DC converter 6. By this process, the voltage value of the DC electric power supplied from the battery 2 to the wiring L1 is converted into another voltage value by the DC/DC converter 5 and the DC/DC converter 6 and the DC electric power having the converted voltage value is supplied to the wiring L2. Thus, the series of processes shown in FIG. 4 ends.

When it is determined in step S5 that DC electric power does not need to be supplied to the load group 50 (step S5: NO), the controller 10 sets the switch 4, the switch 72, and the switch 82 to the non-conductive state (step S9). At this time, the DC/DC converter 5 and the DC/DC converter 6 are not operating. Thus, the series of processes shown in FIG. 4 ends.

In the power supply system 1 described above, the wiring L1 and the DC/DC converter 5 are electrically connected to each other via the filter circuit 71 by setting the switch 72 to the conductive state, and the wiring L1 and the DC/DC converter 6 are electrically connected to each other via the filter circuit 81 by setting the switch 82 to the conductive state. When the DC electric power output from the onboard charger 3 or the DC charger is supplied to the wiring L1 (that is, when the vehicle V is in the charging mode) and it is determined that the DC electric power needs to be supplied to the load group 50, the switch 4 and the switch 72 are set to the conductive state, the switch 82 is set to the non-conductive state, and the DC/DC converter 5 is controlled. Thus, the wiring L1 and the DC/DC converter 5 are electrically connected to each other via the filter circuit 71 capable of reducing noise in a frequency band lower than that of noise that can be reduced by the filter circuit 81. This makes it possible to suppress transmission of noise in a low frequency band to the AC charger or the DC charger.

On the other hand, when the vehicle V is traveling (when the vehicle V is in the driving mode), since the DC/DC converter 5 and the DC/DC converter 6 are not electrically connected to an external power supply, it is not necessary to suppress noise in a low frequency band that can be suppressed by the filter circuit 71 but cannot be suppressed by the filter circuit 81, and the DC/DC converter 6 can be driven. Thus, when a large amount of DC electric power is required in the load group 50, a large amount of DC electric power can be supplied to the load group 50 by driving the DC/DC converter 5 and the DC/DC converter 6. Further, although the filter circuit 81 can suppress only noise in a frequency band higher than that of noise that can be suppressed by the filter circuit 71, the filter circuit 81 has a smaller circuit scale and is more affordable than the filter circuit 71. Therefore, it is possible to provide the power supply system 1 capable of supplying a large amount of electric power to the load group 50 and suppressing transmission of noise in a low frequency band to an external power supply at a low cost, and it is possible to suppress an increase in size of the power supply system 1.

As shown in FIG. 7, when the switch 72 and the switch 82 are set to the conductive state, the DC/DC converter 5 and the DC/DC converter 6 operate at the same time. Therefore, noise generated by one DC/DC converter may be input to the other DC/DC converter, and the voltage value of the output terminal can fluctuate due to the noise. Specifically, noise generated by the switching operation of the DC/DC converter 5 may be transmitted through a path P1 passing through the filter circuit 71, the switch 72, the wiring L1, the switch 82, the filter circuit 81, and the DC/DC converter 6 in order. In this case, when the resonance frequency fr11 of the filter circuit 71 (the resonance frequency of the filter circuit 71 when a signal passes through the filter circuit 71 from the DC/DC converter 5 toward the wiring L1) matches the resonance frequency fr22 of the filter circuit 81 (the resonance frequency of the filter circuit 81 when a signal passes through the filter circuit 81 from the wiring L1 toward the DC/DC converter 6), noise is not sufficiently reduced due to resonance, and the fluctuation range of the voltage value at the output terminal 6b of the DC/DC converter 6 may exceed the allowable range of the input voltage of the load group 50.

Similarly, noise generated by the switching operation of the DC/DC converter 6 may be transmitted through a path P2 passing through the filter circuit 81, the switch 82, the wiring L1, the switch 72, the filter circuit 71, and the DC/DC converter 5 in order. In this case, when the resonance frequency fr12 of the filter circuit 71 (the resonance frequency of the filter circuit 71 when a signal passes through the filter circuit 71 from the wiring L1 toward the DC/DC converter 5) matches the resonance frequency fr21 of the filter circuit 81 (the resonance frequency of the filter circuit 81 when a signal passes through the filter circuit 81 from the DC/DC converter 6 toward the wiring L1), noise is not sufficiently reduced due to resonance, and the fluctuation range of the voltage value at the output terminal 5b of the DC/DC converter 5 may exceed the allowable range of the input voltage of the load group 50.

On the other hand, in the power supply system 1, the cutoff frequency fc1 and the cutoff frequency fc2 are set so that the resonance frequency fr11 of the filter circuit 71 does not match the resonance frequency fr22 of the filter circuit 81, and the resonance frequency fr12 of the filter circuit 71 does not match the resonance frequency fr21 of the filter circuit 81. According to this configuration, since the resonance frequency of the filter circuit 71 does not match the resonance frequency of the filter circuit 81 in each path, the fluctuation range of the voltage value at the output terminal 5b of the DC/DC converter 5 and the fluctuation range of the voltage value at the output terminal 6b of the DC/DC converter 6 can be prevented from exceeding the allowable range of the input voltage of the load group 50. Therefore, it is possible to stably supply electric power to the load group 50.

In the power supply system 1, when DC electric power needs to be supplied to the load group 50 in the driving mode, the DC/DC converter 6 is used first. According to this control, the frequency at which the DC/DC converter 5 is used can be reduced as compared with the configuration in which the DC/DC converter 5 is used first in the driving mode, so that the possibility of failure of the DC/DC converter 5 can be reduced.

Although an embodiment of the present disclosure has been described in detail above, the power supply system according to the present disclosure is not limited to the embodiment described above.

In the above embodiment, in step S7, the controller 10 sets the switch 72 to the non-conductive state, sets the switch 82 to the conductive state, and drives the DC/DC converter 6. Alternatively, the controller 10 may set the switch 72 to the conductive state, set the switch 82 to the non-conductive state, and drive the DC/DC converter 5. That is, in the driving mode, when the DC/DC converter 5 is used first and sufficient electric power cannot be supplied by the DC/DC converter 5 alone, the DC/DC converter 6 may be used.

When it is determined that DC electric power needs to be supplied to the load group 50 in the driving mode (step S5: YES), the controller 10 may set the switch 72 and the switch 82 to the conductive state and drive the DC/DC converter 5 and the DC/DC converter 6 regardless of whether or not the electric power is insufficient.

The filter circuits 71 and 81 are not limited to fixed filters, but may be variable filters.

Even when the resonance frequency fr11 of the filter circuit 71 matches the resonance frequency fr22 of the filter circuit 81, the fluctuation range of the voltage value at the output terminal 6b of the DC/DC converter 6 may fall within the allowable range of the input voltage of the load group 50 depending on the noise level at the frequency. Similarly, even when the resonance frequency fr12 of the filter circuit 71 matches the resonance frequency fr21 of the filter circuit 81, the fluctuation range of the voltage value at the output terminal 5b of the DC/DC converter 5 may fall within the allowable range of the input voltage of the load group 50 depending on the noise level at the frequency.

Therefore, the cutoff frequency fc1 and the cutoff frequency fc2 may be set so that the fluctuation range of the voltage value at the output terminal 5b of the DC/DC converter 5 and the fluctuation range of the voltage value at the output terminal 6b of the DC/DC converter 6 when the switch 72 and the switch 82 are set to the conductive state fall within the allowable range of the input voltage of the load group 50. According to this configuration, the fluctuation range of the voltage value at the output terminal 5b of the DC/DC converter 5 and the fluctuation range of the voltage value at the output terminal 6b of the DC/DC converter 6 fall within the allowable range of the input voltage of the load group 50. This makes it possible to supply stable DC electric power to the load group 50.

The filter unit 7 does not have to include the switch 72, and the filter unit 8 does not have to include the switch 82. Further, the power supply system 1 does not have to include the switch 4. In other words, at least one of the switch 4, the switch 72 and the switch 82 does not have to be provided.

The position where the switch 4 is provided is not limited to between the onboard charger 3 and the wiring L1. For example, the switch 4 may be provided closer to the battery 2 than the connection point on the wiring L1 to which the onboard charger 3 is connected, and closer to the connection point to which the onboard charger 3 is connected than either the connection point on the wiring L1 to which the filter unit 7 is connected or the connection point on the wiring L1 to which the filter unit 8 is connected. In this configuration, the filter unit 7 does not have to include the switch 72, and the filter unit 8 does not have to include the switch 82.

The switch 4 may be provided at a position between the connection point on the wiring L1 to which the filter unit 7 is connected and the connection point on the wiring L1 to which the battery 2 is connected and between the connection point on the wiring L1 to which the filter unit 8 is connected and the connection point on the wiring L1 to which the battery 2 is connected. In this configuration, the filter unit 7 does not have to include the switch 72, and the filter unit 8 does not have to include the switch 82.

What is claimed is:

1. A power supply system mounted on a vehicle, the power supply system comprising:
    a wiring to which direct current (DC) electric power is supplied from an external power supply;
    a DC power supply connected to the wiring;
    a first DC/DC converter configured to convert a voltage value of the DC electric power supplied to the wiring into another voltage value to output the DC electric power to a load group including at least one load;
    a first filter unit having a first cutoff frequency and connected to the wiring and the first DC/DC converter;
    a second DC/DC converter configured to convert the voltage value of the DC electric power supplied to the wiring into another voltage value to output the DC electric power to the load group;
    a second filter unit having a second cutoff frequency higher than the first cutoff frequency and connected to the wiring and the second DC/DC converter; and
    a controller configured to control the first DC/DC converter and the second DC/DC converter, wherein
    the controller controls the first DC/DC converter when DC electric power is supplied from the external power supply to the wiring and when DC electric power needs to be supplied to the load group, and
    the first cutoff frequency and the second cutoff frequency are set so that a fluctuation range of a voltage value at an output terminal of the first DC/DC converter and a fluctuation range of a voltage value at an output terminal of the second DC/DC converter fall within an allowable range of an input voltage of the load group.

2. The power supply system according to claim 1, wherein the first cutoff frequency and the second cutoff frequency are set so that a resonance frequency of the first filter unit when a signal passes through the first filter unit from the first DC/DC converter toward the wiring does not match a resonance frequency of the second filter unit when a signal passes through the second filter unit from the wiring toward the second DC/DC converter and so that a resonance frequency of the first filter unit when a signal passes through the first filter unit from the wiring toward the first DC/DC converter does not match a resonance frequency of the second filter unit when a signal passes through the second filter unit from the second DC/DC converter toward the wiring.

* * * * *